Sept. 2, 1969     G. F. ERICKSON     3,464,889
HEAT ACTUATED CONTROL ROD UTILIZING A CADMIUM-POTASSIUM MIXTURE
Filed Nov. 1, 1967     2 Sheets-Sheet 1

INVENTOR.
George F. Erickson

Sept. 2, 1969  G. F. ERICKSON  3,464,889
HEAT ACTUATED CONTROL ROD UTILIZING A CADMIUM-POTASSIUM MIXTURE
Filed Nov. 1, 1967  2 Sheets-Sheet 2

INVENTOR.
George F. Erickson

United States Patent Office 3,464,889
Patented Sept. 2, 1969

3,464,889
HEAT ACTUATED CONTROL ROD UTILIZING A CADMIUM-POTASSIUM MIXTURE
George F. Erickson, Los Alamos, N. Mex., assignor to the United States of America as represented by the United States Atomic Energy Commission
Filed Nov. 1, 1967, Ser. No. 679,828
Int. Cl. G21c 7/10
U.S. Cl. 176—86      1 Claim

ABSTRACT OF THE DISCLOSURE

An enclosed nuclear reactor control rod for a two-region reactor, the inside of the enclosure having a capillary path, two different condensable vapors inside the enclosure (e.g., potassium and cadmium), one of the materials having a higher vapor pressure than the other above the desired temperature of operation of the reactor and a lower vapor pressure than the other below said temperature, one of said materials having a high neutron absorption cross section at thermal energies, the device positioned so that an increase in temperature will preferentially send the high cross section material to the thermal region thereby slowing down the fission rate (and lowering the temperature) of the reactor is described.

---

The invention relates to control rods for nuclear reactors. The invention described herein was made in the course of, or under, a contract with the U.S. Atomic Energy Commission.

Nuclear control rods of the prior art have utilized moving parts and consequently much engineering and over-engineering have gone into these devices to assure safety and reliability. The device of the present invention utilizes no moving parts at all and reacts automatically to changing conditions in the reactor.

"Heat pipes" embodying the use of capillary paths inside an enclosure to transport condensed vapors are known for their efficiency in transferring heat with almost no temperature differential. For example, see U.S. Patent No. 3,229,759 for an "Evaporation-Condensation Heat Transfer Device" issued to G. M. Grover on Jan. 18, 1966. These devices have been incorporated in nuclear reactors for the purpose of cooling the anode of a plasma thermocouple utilized in a nuclear reactor configuration. For example, see U.S. Patent No. 3,243,613 for a "Pancake Reactor" issued to G. M. Grover on Mar. 29, 1966. This latter patent specification also discloses the use of a condensable poison in a heat pipe configuration for use as a poison rod.

Figure 2:
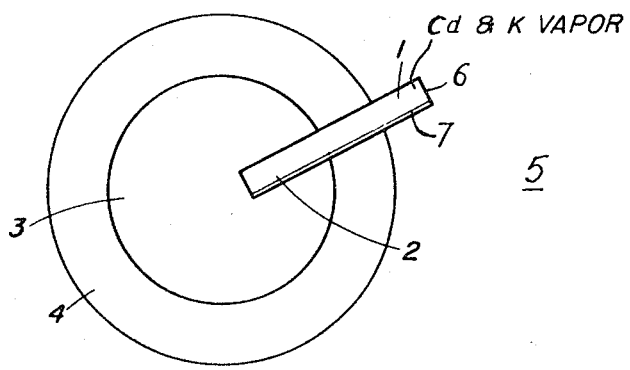
FIGURE 2 is a schematic drawing of a reactor having a fast neutron core surrounded by a slow neutron region or blanket with a heat pipe used as a control rod inserted in the core with the other extremity of said pipe being in the slow neutron region.

In FIG. 2, a two-region nuclear reactor is indicated generally at 5. If a rod 6 is placed so that one end 2 is in the fast region 3 of an two-region reactor and the other end 1 is in the thermal region 4, the reactor being thermally operated at the temperature at which the two condensable vapors (potassium and cadmium) have equal vapor pressures, then a rise in temperature in the fast region will preferentially distill cadmium to the thermal region. Since cadmium has an exceedingly high thermal neutron absorption cross section (and a small fast neutron cross section) the reactor will tend to lower its temperature. Conversely, a drop in temperature will preferentially send cadmium to the fast region of the reactor, thereby tending to increase the temperature back to normal operating temperature.

Figure 1:
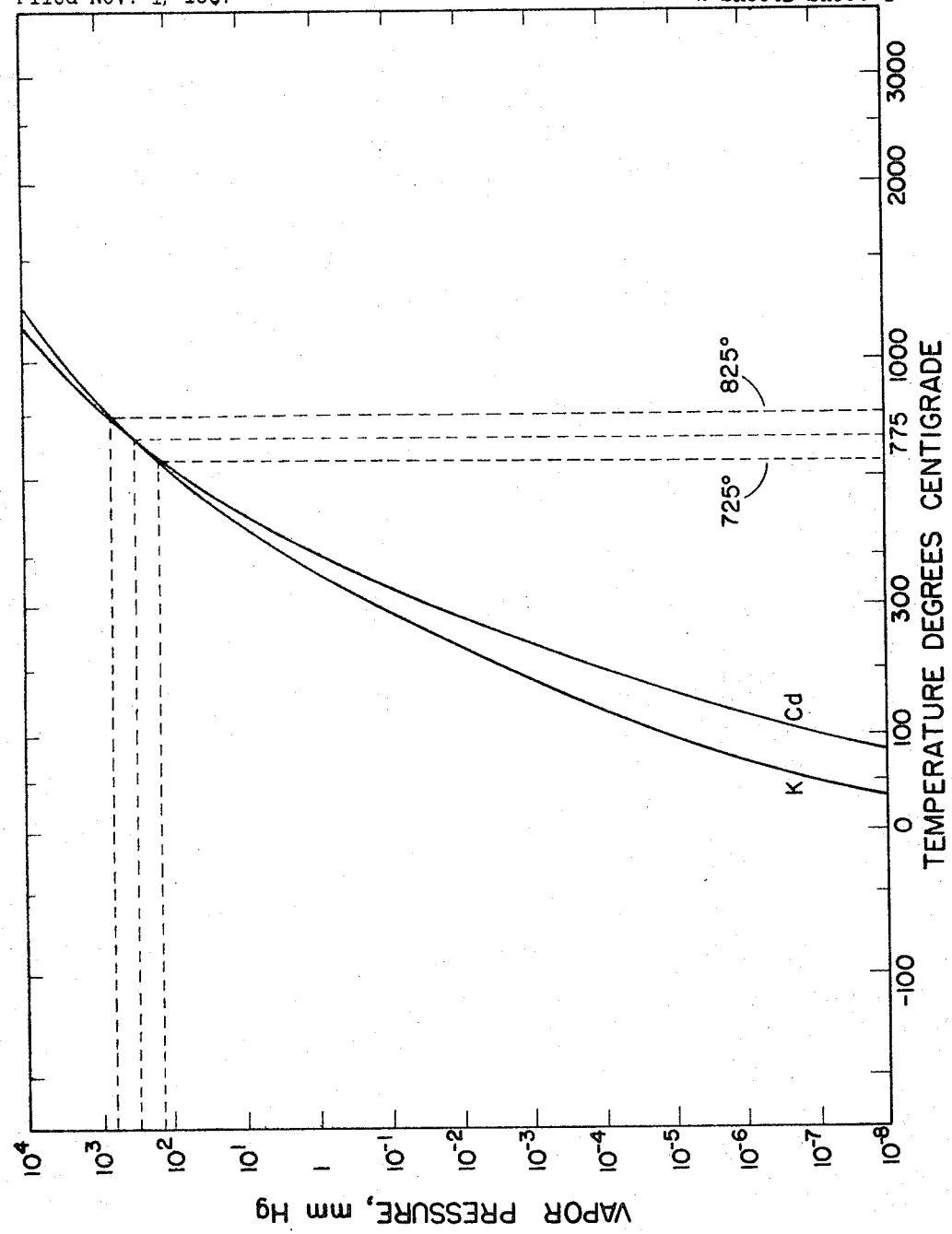
FIGURE 1 is a graph showing vapor pressure in millimeters of mercury for temperature and degrees centigrade for potassium and cadmium.

The control rod 6 of the present invention may be a simple cylindrical container or other configuration as described in U.S. Patent No. 3,229,759 issued to G. M. Grover on Jan. 18, 1966, and U.S. Patent No. 3,243,613 issued to G. M. Grover on Mar. 29, 1966. Such a rod would be placed in a two-region reactor (e.g., coupled reactors) such as those described in vol. 12 of the Second United Nations International Conference on the Peaceful Uses of Atomic Energy held in Geneva Sept. 1 to Sept. 13, 1958, published by the United Nations, pages 151 to 195. One end 2 of the rod should be placed in the inner (fast region) core 3 and the other end 1 in the thermal region 4 (see FIG. 2). The rod is, of course, supplied with a capillary path 7 on its inside surface as is specified in the above two U.S. patent descriptions, and the device of the present invention utilizes two condensable vapors (cadmium and potassium) instead of one as contemplated before in the prior art. Referring to FIG. 1 it is seen that below 775±50° C. potassium is more volatile than cadmium, whereas above this temperature the situation is reversed, cadmium being more volatile than potassium.

Accordingly, in practicing the present invention, the fast region of such a reactor is operated at 775±50° C., the temperature range at which the vapor pressure of potassium and cadmium is equal. At this temperature cadmium and potassium are equally distributed throughout the control rod of the present invention. However, an increase in temperature in the fast region will, as can be seen from FIG. 1, preferentially distill cadmium from the fast region to the thermal region of the coupled reactor. The neutron absorption cross section of cadmium varies drastically between fast and slow neutrons, i.e., for fast neutrons cadmium has a total absorption cross section of about 4½ barns while its cross section for slow neutrons is on the order of 3,000 barns. Accordingly, if cadmium is preferentially distilled to the thermal region of the reactor, the neutron absorption int his region will increase rapidly, thereby bringing down the neutron flux and temperature of this region.

Conversely, if the temperature of the fast region falls below 775±50° C. potassium will preferentially distill into the thermal region. Potassium has about the same low neutron absorption cross section for fast as for slow neutrons (i.e., 3–4 barns). Consequently, the preferential migration of cadmium into the fast region will increase the neutron flux and temperature of the thermal region. It can be seen therefore that the control rod of the present invention automatically tends to maintain a two-region reactor at about the same neutron flux and temperature. This control is accomplished without moving parts and is, accordingly, simpler and more reliable than control rods of the prior art. It should be noted that the control rod system as described is not sufficiently effective for use as a startup or shutdown control rod but it is an exceedingly useful control rod in correcting slow changes in reactivity during the operation of a two-region reactor.

Another embodiment of the present invention is a control rod as described in FIG. 2 with the hot end or fast region being insulated so that the temperature at this end of the rod will be in the range of 775±50° C. This insulation may consist of any suitable material that will resist corrosion by the central fuel core or fast region. By insulating the hot end or core end of the control rod the core can operate at temperatures substantially above 775° C. since the control rod will be affected only by the temperature that it sees, namely, 775° C. This change in the embodiment will allow the core region to be operated at temperatures of approximately 1500–1800° C. which is presently the highest temperatures being used in power reactors.

Although not a feature of this invention, the materials utilized to form the device should resist corrosion during operation. The most corrosion-resistant material known at present is pure, very low carbon, iron. This material has a very low creep strength and accordingly for purposes of strength should be encased in high-strength alloy such as Inconel.

It should also be noted that the control rod of the present invention reaches its greatest utility in a horizontal or zero-g (such as found in space applications) situation since gravity may separate the condensable vapors because of their great difference in density. Although the invention has been described with specific reference to a fast core and thermal blanket-type reactor operating at a suitable temperature, it is clear that this control rod may be utilized in any two-region (thermal) reactor, and thus, the foregoing illustrations of the present invention are not intended to limit its scope which is to be limited only by the appended claim.

What is claimed is:

1. In a control rod for a two-region nuclear reactor to be operated in the temperature range of 725° C. to 825° C. with the two regions being a fast region and a thermal region comprising an elongated enclosed container with one end in the fast region and the other end in the thermal region of the reactor, capillary means inside of said container, said container enclosing condensable vapor, the improvement comprising a mixed condensable vapor of cadmium and potassium.

References Cited
UNITED STATES PATENTS

| | | | |
|---|---|---|---|
| 3,229,759 | 1/1966 | Grover | 176—72 |
| 3,243,613 | 3/1966 | Grover | 176—39 |

FOREIGN PATENTS

| | | |
|---|---|---|
| 866,305 | 4/1961 | Great Britain. |
| 866,644 | 4/1961 | Great Britain. |

OTHER REFERENCES

Second U.N. Internation Conf. on the Peaceful Uses of Atomic Energy, vol. 12, 1958, pp. 151–156.

CARL D. QUARFORTH, Primary Examiner

HARVEY E. BEHREND, Assistant Examiner

U.S. Cl. X.R.

176—93